Figure 1:
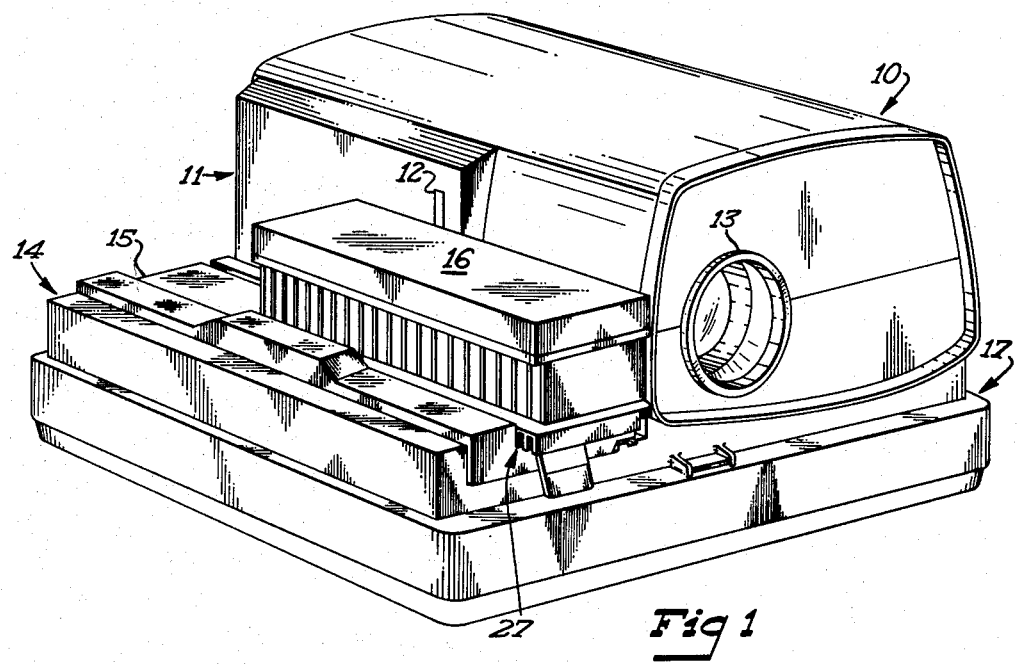

April 20, 1965

W. R. KING 3,178,998

PHOTOGRAPHIC PROJECTOR

Filed Sept. 22, 1961

3 Sheets-Sheet 1

INVENTOR.
WILLIAM R. KING

BY

ATTORNEY

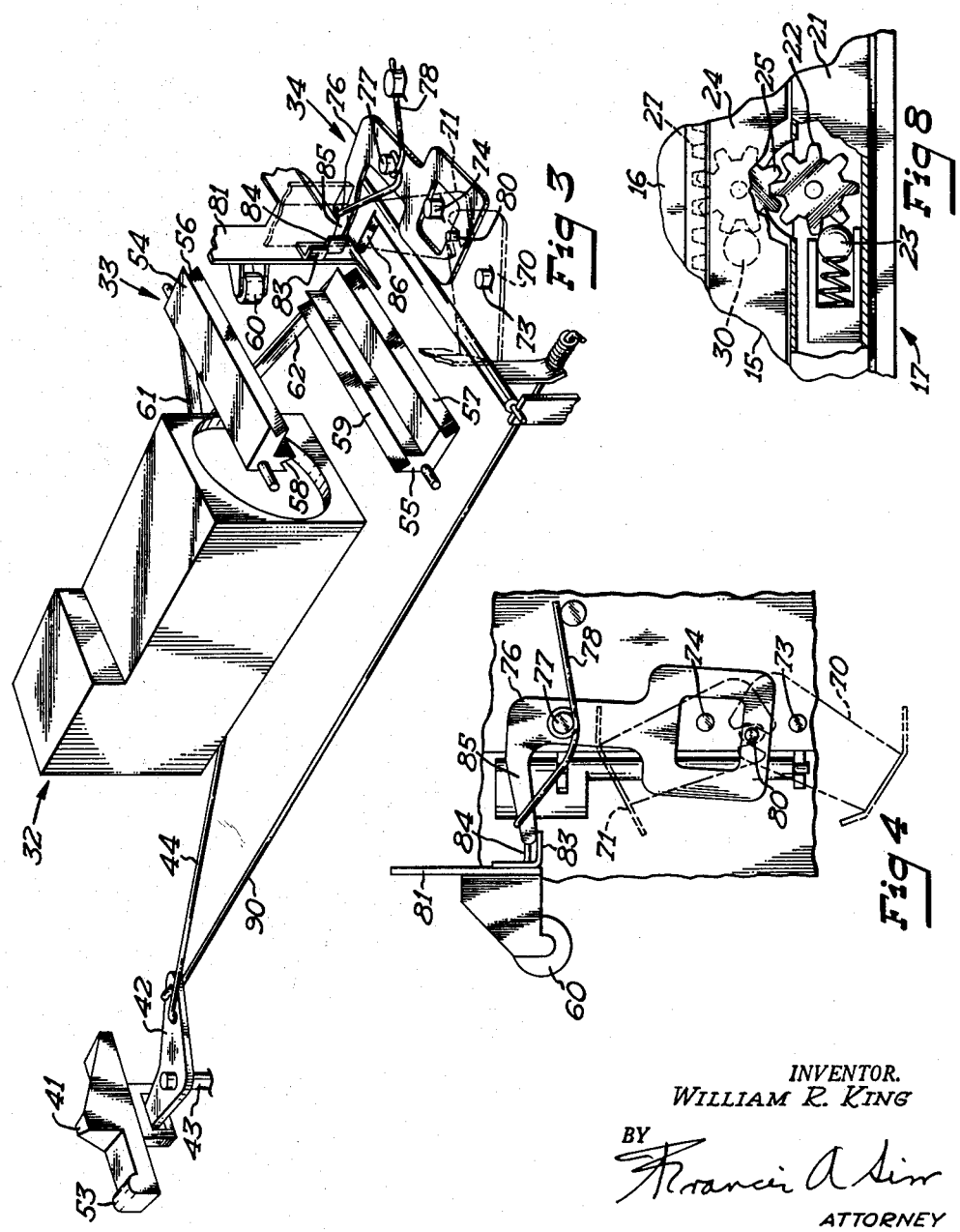

April 20, 1965 W. R. KING 3,178,998
PHOTOGRAPHIC PROJECTOR
Filed Sept. 22, 1961 3 Sheets-Sheet 3
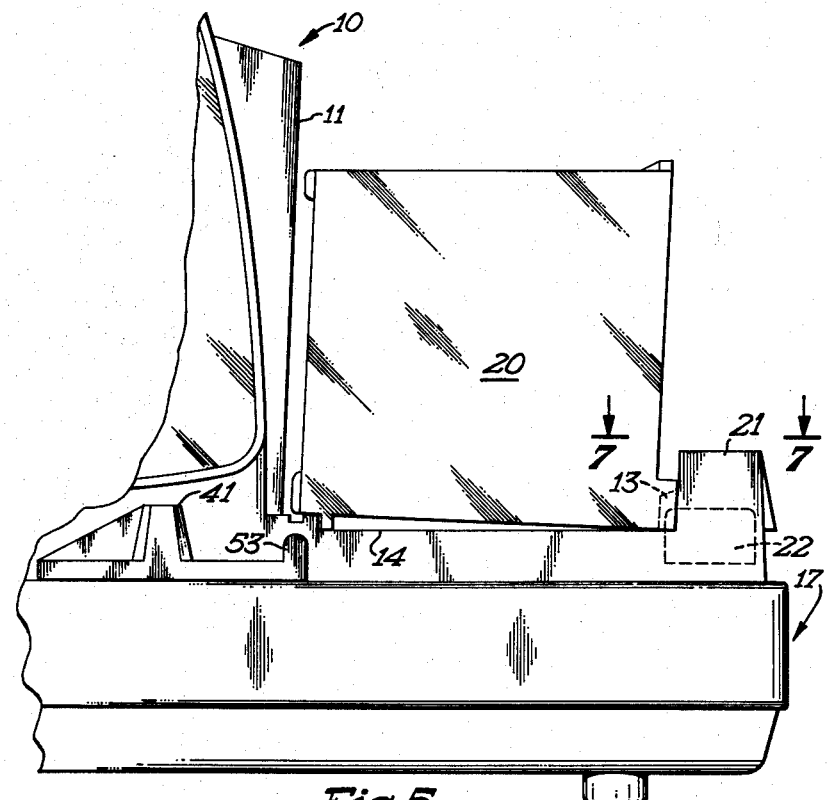
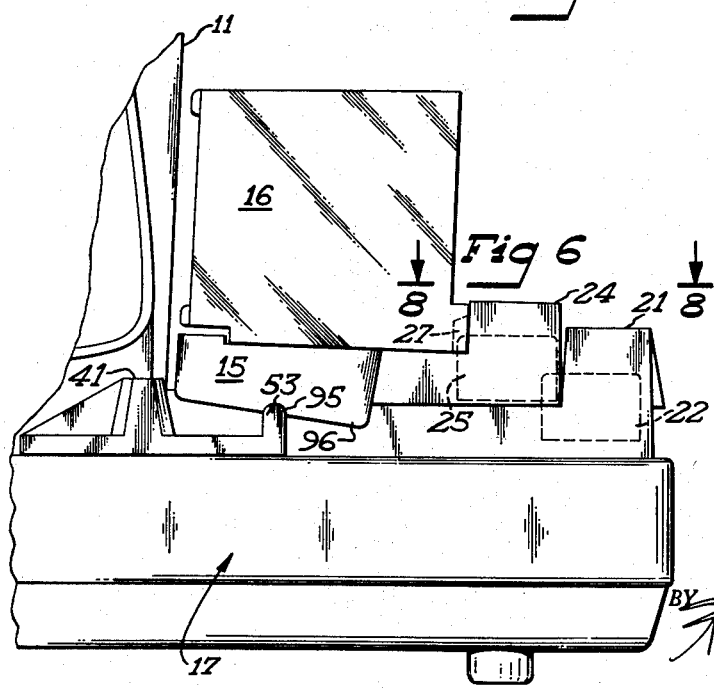
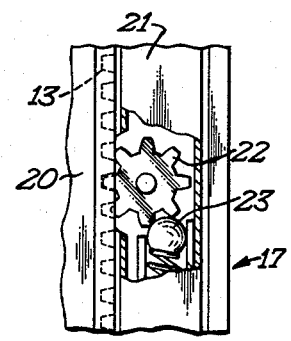
INVENTOR.
WILLIAM R. KING
BY
ATTORNEY United States Patent Office 3,178,998
Patented Apr. 20, 1965

3,178,998
PHOTOGRAPHIC PROJECTOR
William R. King, Denver, Colo., assignor to Honeywell Inc., a corporation of Delaware
Filed Sept. 22, 1961, Ser. No. 140,054
8 Claims. (Cl. 88—24)

The present invention is concerned with an improved photographic projector of the type which is selectively adaptable to project either a large or a small size slide.

The photographic art has progressed to the point where one of the more popular films is color film providing a positive transparency which is adapted to be placed in a photographic projector to be projected on a screen or the like for viewing by a relatively large audience. While this film is available in a number of different sizes, 35 mm. film providing a slide of 2" x 2" dimension and film providing a 2¼" x 2¼" slide have found wide acceptance. Projectors have been constructed to facilitate the projection of either size slide. This, however, has been accomplished with a sacrifice of illumination efficiency of one or the other size slide.

The present invention is directed to an improved photographic projector wherein the projector is selectively operable to project either the large or the small size slide and to do the same with a maximum in illumination efficiency for each size slide. Specifically, the present invention utilizes a light source, this source forming a cone of light to illuminate the slide, wherein the light source is movable in relation to the plane of the slide such that the area of the cone of light at this plane is varied depending upon the size slide being projected. As a further feature of the present invention, means for supporting the individual slides (slide guides) at the optical axis, to be illuminated by the cone of light, are controlled to support, selectively, either the large or the small size slide.

The illuminated slide is then projected through an objective lens to the screen. As is conventional, shutter means are provided to restrict the path of light through the objective lens until such time as the slide is positioned at the optical axis and is illuminated. The shutter is then opened and the subject matter of the slide is presented to the audience. The present invention provides an improved means for actuating the shutter, this means including a structure accommodating different degrees of opening of the shutter, dependent upon the size slide then being presented. Thus, the possibility of light spilling over the edges of the slide to produce an objectionable illuminated border at the screen is eliminated. For example, the shutter is actuated in such a manner that the degree of opening of the shutter is smallest when the small 35 mm. slide is being displayed. Thus, while an entire scene is presented to the audience, there is no chance of light spilling out around the smaller 2" x 2" slide by virtue of the smaller opening of the shutter.

In the preferred embodiment of my invention I disclose an automatic type projector including a slide tray platform adapted to receive a slide storage tray holding a plurality of individual photographic slides, for example 30 slides. The automatic projector, as is conventional, is provided with slide changing means to selectively move individual slides from the slide storage tray to the optical axis of the projector from which the individual slide is displayed on the screen. The slide tray is moved along in steplike fashion so that all of the individual slides within the tray are displayed one at a time. As a feature of my invention, I further provide a slide tray adaptor which cooperates with the slide tray platform of the automatic projector, the adaptor mounting the slide storage tray for the small slides. In this manner, a single slide receiving window in the side of the housing of the projector receives either the large or the small size slide. The main control means of my invention that is the mechanism which controls the light source, the slide guides, and the shutter, to accommodate showing of either the small or the large size slides, also is provided with interlock means cooperating with the slide tray platform such that the slide tray adaptor may be placed in operative position only when the control means is in a position to condition the projector for use with the small size slides. Thus, accidental setting of the control means for operation with a large size slide, while having a small size slide tray in operative position on the slide tray platform is eliminated.

Figure 2:
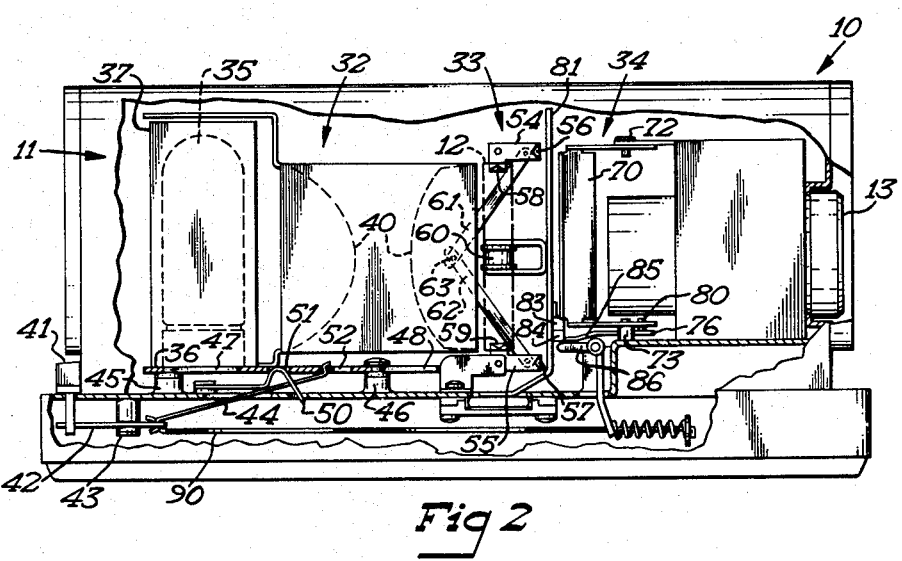

My invention will be apparent to those skilled in the art upon reference to the following specification, claims and drawings, of which:

FIGURE 1 is a perspective view of an automatic slide projector, showing the small size slide tray adaptor holding a small size slide tray in operative position on the slide tray platform of the projector, FIGURE 2 is a side view of a portion of the projector of FIGURE 1, wherein the side wall of the housing is broken away to disclose components forming the optical axis of the projector, FIGURE 3 is an exploded view showing the relationship of the basic components disclosed in FIGURE 2, FIGURE 4 is a top view of the shutter actuating mechanism as disclosed in FIGURE 2, and as partially disclosed in FIGURE 3, FIGURE 5 is an end view of the slide tray receiving platform of the projector, showing the control means set to accommodate the projector for use with the large size slides and showing the large size slide tray in position on the slide tray receiving platform, FIGURE 6 is a view similar to FIGURE 5, showing the control means in position to accommodate the showing of small size slides, showing the small size slide tray adaptor in position on the slide tray platform, and showing the small size slide tray in position on the adaptor, and FIGURES 7 and 8 are views showing the drive mechanism for the slide trays, FIGURE 7 showing the means for driving the large size slide tray, and FIGURE 8 showing the means for driving the small size slide tray.

Referring specifically to FIGURE 1, reference numeral 10 identifies the main housing member of my projector this housing having a side wall member 11 including a slide receiving window 12. The forward end of housing 10 includes an objective lens 13 which is movable, by means not shown, to facilitate focusing of the projector. Immediately adjacent housing 10 is a slide tray receiving platform identified generally by means of reference numeral 14 (see FIGURE 5), platform 14 of FIGURE 1 having a small size slide tray adaptor 15 positioned thereon, the adaptor having a small size slide tray 16 mounted on the adaptor. In this manner, the slide tray 16, which holds a plurality of individual photographic slides, is positioned in cooperating relation to the slide receiving window 12. As is well known, an automatic photographic projector is provided with slide changing means to engage an individual slide within slide tray 16 and to then move this slide out of the tray, through window 12, to a position in alignment with the optical axis of the projector, this axis being formed by components contained within housing 10. In this manner, the slide is illuminated and is projected through the objective lens 13 to a screen or the like. This slide is subsequently returned by the slide changing means, the slide tray 16 is moved or indexed a distance equal to the spacing of the individual photographic slides within the tray, and a second slide is returned to the optical axis of the projector.

The exact manner in which this function is accomplished is not essential to the present invention and therefore, for purposes of simplicity, I will not describe the details of the slide changing means or the slide tray advancing means. It suffices to say that the slide changing means and the slide tray advancing means are disposed within housing 10 and the base 17 of my projector, portions of which will be apparent in the following description.

Referring to FIGURES 5 and 6, I have shown a back view of the projector of FIGURE 1 and from these views the construction of the slide tray receiving platform 14 of FIGURE 5 (in this view containing a large size slide tray 20) can be more readily seen. Thus, it can be seen that slide tray 20 is disposed in operative relation to the side wall 11 of the projector, this side wall containing the slide receiving window 12, as seen in FIGURE 1. The slide receiving platform 14 includes an elongated shoulder member 21, this member forming a guide for slide tray 20 and also housing a drive sprocket 22 of the slide tray indexing means. This gear or sprocket 22 engages a gear rack formed at the bottom edge of the slide tray, this gear rack being identified generally by means of reference numeral 13. FIGURE 7 shows a view of gear rack 13 in engagement with sprocket 22, this sprocket being biased by a spring biased ball 23 engaging the sprocket to prevent inadvertent movement of the sprocket as a result of a slight jar of slide tray 20. As has been mentioned, the slide tray indexing means is effective to cause sprocket 22 to move the distance of one tooth and thereby index or move the slide tray to bring the next succeeding slide storage compartment into alignment with the slide receiving window 12. In this fashion, the slides within the slide tray are shown, one at a time, on the screen.

FIGURE 6 shows the slide tray platform 14 with slide tray adaptor 15 in position on the platform. The small size slide tray 16 is mounted on adaptor 15 and from this view it can be seen that the small size slide tray 16 is likewise positioned in operative relation to the side wall 11 of the projector. Adaptor 15 is likewise provided with an elongated shoulder 24, this shoulder housing a further gear or sprocket 25 engaging a gear rack formed on the lower corner of the slide tray 16, this gear rack being identified by reference numeral 27 in both FIGURES 1 and 6.

FIGURE 8 discloses more clearly gear rack 27 engaging sprocket 25 contained within shoulder 24 of adaptor 15, sprocket 25 in turn engaging sprocket 22. Adaptor 15 is likewise provided with a spring bias ball 30 which, in the manner of ball 22, is biased to engage sprocket 25 to prevent inadvertent movement of slide tray 16. Thus, it will be readily appreciated that the slide tray advancing means, which causes rotation of sprocket 22, likewise causes rotation of sprocket 25 to index or move the small size slide tray 16.

Referring now to FIGURE 2, this figure shows the essential portions of the internal construction of my projector, disposed within the housing 10, wherein the side wall 11 has been broken away to expose a light source 32, a slide guide means 33, a shutter means 34, and objective lens 13, which components are mounted in alignment to form the optical axis of the projector. As can be seen, light source 32 and shutter means 34 are located on opposite sides of the slide receiving window 12, this window being shown in broken lines in FIGURE 2. The slide guide means 33 on the other hand is positioned in alignment with the plane of window 12 and is disposed to hold either the large or the small size slide in alignment with the optical axis, immediately adjacent the position occupied by slide receiving window 12.

More specifically, the light source 32 includes a projection bulb 35 mounted on a movable support or platform member 36, this platform being movable, as will be described. Immediately adjacent the projection bulb 35 is a reflector member 37.

The light produced by the bulb 35 is formed into a cone of light by condensing lens means 40. This cone of light is a forward directed cone, having its apex at the objective lens 13 and having its wider dimension at the condensing lens means 40. Thus, the cross-sectional area of the cone of light at the slide guide means 33 varies as a function of the position of platform 36. The position of this platform is controlled by a control means 41 which is movable to control the position of a link 42 pivoted at 43 and connected to a control rod 44. This control rod in turn is operatively connected to platform member 36. Thus, upon control rod 44 being moved to the left, platform 36 also moves to the left, this platform being positioned on bosses 45 and 46 and being mounted by means of elongated slots 47 and 48 cooperating with the bosses 45 and 46. A springlike lock member 50 cooperates with openings 51 and 52 formed in platform 36 to lock this platform in its right hand position (as shown in FIGURE 2) or in its left hand position to which it is moved by movement of control rod 44 to the left from the position shown in FIGURE 2. It will be immediately apparent that movement of platform 36 to the left reduces the cross-sectional area of the cone of light at the position of the slide guide means 33 and thus accommodates a maximum illumination efficiency of the small type slide since the slide is illuminated by substantially the entire cone of light. The apparatus as shown in FIGURE 2 is conditioned to provide a relatively large area of illumination at slide guide means 33, and thus provide optimum illumination of a large size slide.

FIGURE 3 is an exploded view showing more clearly the configuration of the control member 41, pivoted link 42, control rod 44, and the light source 32. Furthermore, FIGURES 3, 5 and 6 show interlock means 53 of the control means 41, this interlock means cooperating with slide tray adaptor 15, as will be described.

Referring now to the slide guide means 33, this means consists of first and second members 54 and 55 which are pivotally mounted at the plane of slide receiving window 12. Members 54 and 55 rotate about their pivots to selectively bring first or second channel members into alignment with the slide receiving window to thus support the small or large size slide. The configuration of the members 54 and 55 can be seen more clearly in FIGURE 3 wherein the first channels 56 and 57 and the second channels 58 and 59 of the slide guide members are clearly shown. The channels 58 and 59 are shown to be in alignment with slide receiving window 12 and thus define the means through which the large size slide is moved by means of slide changing means including a magnet 60, to thus position the large size slide at the optical axis of the projector.

Movement of the members 54 and 55 of the slide guide means 33 is controlled by linkages 61 and 62, these linkages being pivotally connected to the housing of light source 32 at a pivot 63, as seen in FIGURE 2. Thus, when control means 41 is moved to effect movement of light source 32 to the left, the slide guide means 33 is also modified to hold the small size slide at the slide receiving window 12. Thus, members 54 and 55 are rotated to bring channels 56 and 57 into alignment with window 12. As has been mentioned, such movement also results in a smaller area of illumination being present at the plane of the slide receiving window and thus maximum illumination efficiency results.

Referring now to the shutter means 34, this shutter means includes first and second movable members 70 and 71, shown in phantom in FIGURE 4. FIGURE 3 shows portions of members 70 and 71, likewise in phantom, and FIGURE 2 shows member 70, this member hiding member 71 in the view of FIGURE 2.

Shutter member 70 is pivoted, both at its upper extremity and its lower extremity by means of fixed pivots. The upper fixed pivot of member 70 is identified by reference numeral 72. The upper pivot of member 71 is hidden in FIGURE 2. The lower pivot of member 70 is identified by means of reference numeral 73, the lower pivot of member 71 being hidden.

Shutter member 71 is pivoted at corresponding upper and lower pivots, the lower pivot being shown in FIGURES 3 and 4 and identified by reference numeral 74. Movement of the shutter members 70 and 71 is controlled by a spring biased drive link 76 which is pivotally mounted at pivot 77 and is biased for counterclockwise rotation about this pivot by means of a spring 78. Link 76 includes a drive pin 80 engaging slots formed in the lower portions of shutter members 70 and 71. Thus, clockwise rotation of member 76 about its pivot 77 causes pin 80 to move in a generally left hand direction as seen in FIGURE 4 to thus cause the shutter members 70 and 71 to open, as shown in this figure. FIGURE 2 shows the position of drive link 76 with the shutter in a closed position and here it can be seen that drive pin 80 lies to the right of pivot 73 whereas in FIGURES 3 and 4, wherein the shutter is open, this drive pin 80 has moved to a position forward the pivots 73 and 74.

As has been mentioned, the slide changing mechanism, only a portion of which is shown, includes a magnet 60. This magnet is positioned on a movable member 81 which is movable to the vicinity of the slide receiving window 12 such that magnet 60 engages the slides within the slide storage tray, these slides either being mounted in a magnetic mounting or having a magnetic clip disposed on the edge of the slide to facilitate magnetic attraction by magnet 60. Thus, a slide is moved through the slide guide means 33 to be positioned at the optical axis of the projector and to be then displayed on the screen. In FIGURES 3 and 4, member 81 is shown at the position wherein a slide would be displayed on the screen and thus the shutter is opened. The opening of the shutter is accomplished by a pair of tabs 83 and 84 carried by member 81. In practice, the shutter is opened only after a slide has been positioned at the optical axis.

As can be seen most clearly in FIGURES 3 and 4, drive link 76 includes an extension 85 adapted to selectively engage either tab 83 as seen in FIGURE 4 or tab 84 as seen in FIGURE 3. The position of extension 85 is controlled by a member 86, this member being effective to lift extension 85 from the position shown in FIGURE 3 to the position shown in FIGURE 4, under the control of a further control rod 90 connected to link 42. As seen in FIGURE 2, control member 41 is positioned to accommodate the showing of the large size slides and thus does not engage member 85. As a result, extension 85 is controlled by tab 84 (see FIGURE 3) to produce the maximum opening of the shutter means 70–71. However, movement of control member 41 such that link 42 is pivoted in a counterclockwise direction about its pivot 43 (see FIGURE 3) causes member 86 to elevate extension 85 and thus extension 85 is actuated by tab 83, as shown in FIGURE 4. Thus, a smaller degree of opening of shutter 70–71 is accomplished, it being remembered that this type of control by member 41 also modifies the position of light source 32 and slide guide means 33 to accomplish the positioning and the maximum illumination of a small slide received from the slide receiving window 12.

Referring again to FIGURE 6, it will be remembered that this figure discloses the use of the slide tray adaptor 15 to support the small size slide tray 16. In order to condition my projector for use with the small size slides, it is necessary that the control member 41 be moved to the right from the position shown in FIGURE 5 to the position shown in FIGURE 6. This accomplishes the above mentioned counterclockwise rotation of link 42 about its pivot 43 to thus change the light source 32, the slide guide means 33, and the shutter means 34 to accomplish the maximum in efficient illumination of the small size slide to be positioned at window 12. Furthermore, such movement of control member 41 moves interlock extension 53 of this member into alignment with a notch 95 formed in the portion 96 of the slide tray adaptor 15. Thus, in order for the slide tray adaptor 15 to be operatively positioned at the slide tray receiving platform 14 of the projector, it is necessary that control member 41 be moved to the position shown in FIGURE 6 wherein means 53 cooperates with means 95.

From the above detailed explanation of my invention, it can be seen that I have provided an improved photographic projector wherein a light source 32, a slide guide means 33, shutter means 34, and objective lens 13 are located within a housing 10 to define the optical axis of my projector. Adjacent this optical axis is a slide receiving window 12 formed in the side wall 11 of the projector. A slide tray platform 14 is located adjacent the side wall and through the means of a slide tray adaptor 15 and an interlock means 53–95, either a large or a small size slide tray may be positioned in cooperative relation with the slide receiving window 12. The position of my interlock means 53 is controlled by a control member 41 which is operative to condition the projector for maximum illumination efficiency of either the large or the small size slide, this illumination efficiency being achieved by movement of light source 32 accompanied by modification of the slide guide means 33 to support the proper size slide at the optical axis and in the plane of the slide receiving window 12. Furthermore, my invention utilizes a unique structural arrangement for controlling the degree of opening of the shutter means 70–71, providing a larger degree of opening for the larger size slide.

Other modifications of my invention will be apparent to those skilled in the art and it is thus intended that the scope of the present invention be limited solely by the scope of the appended claims.

I claim as my invention:

1. A photographic projector comprising; a light source movably mounted and movable axially along the optical axis of the projector, slide guide means having first and second means to receive large or small size slides respectively, means mounting said slide guide means at a position along the optical axis, shutter means, means mounting said shutter means at a position along the optical axis, shutter actuating means including control means to effect different degrees of opening of said shutter means, and a control member operatively connected to said light source, said slide guide means and said shutter control means to control the same concurrently to facilitate projection of large or small size slides.

2. In a photographic projector, a light source and light condensing means mounted on a base member, means movably mounting said base member on the projector to define an optical axis with said base member being movable along said axis, said light source and condensing means forming a cone of light along said axis, slide guide means pivotally mounted at a fixed position along said axis to support a slide at said fixed position, said slide guide means having first means to support a small slide and second means to support a large slide, said slide guide means being pivoted to selectively bring said first or said second means into registry with said fixed position, and control means connected to concurrently control the position of said base member and said slide guide means to illuminate the large and the small size slides with substantially the full cone of light formed by said light source and condensing means to provide maximum illumination efficiency.

3. In a photographic projector, a housing having a slide receiving window adapted to receive large or small size slides, a light source and condensing means mounted on a base member to form a cone of light to define an optical axis for the projector, means movably mounting said base member to allow movement thereof along the optical axis to thus move said cone of light in relation to said window, movable slide guide means mounted at said window and having large slide support means and small slide support means adapted to be brought into registry with said window upon movement of said slide guide means, a slide engaging member movable across said optical axis to move a slide through said window to position the slide at the optical axis, shutter means normally effective to restrict the light along said optical axis and effective when opened to allow the light to be projected on a screen or the like, movable shutter control means operatively connecting said shutter means to said slide engaging member to effect opening of said shutter means upon a slide being positioned at the optical axis, said shutter control means being movable to effect a first and a second degree of opening of said shutter means, and further control means connecting in over-all control of said base member, said slide guide means and said shutter control means to concurrently move the same and selectively facilitate the projection of large or small size slides.

4. A photographic projector comprising; a housing having a slide receiving window, a slide tray platform adapted to support a large size slide tray adjacent said window so that large size slides may be moved through said window into said housing, a slide tray adaptor adapted to support a small size slide tray adjacent said window so that small size slides may be moved through said window into said housing, a light source including light control means movably mounted within said housing to produce a cone of light along an optical axis adjacent said window, said light control means being movable to facilitate axial movement of said cone of light relative to said window to thereby match the cross-sectional area of said cone of light at said window to the size of the slide which is to be projected, a movable control member including interlock means disposed adjacent said slide tray platform, and means connecting said control member in controlling relation to said light control means to move the same, said control member being effective when in position to effect illumination of a large slide to prevent use of said slide tray adaptor by virtue of said interlock means.

5. An automatic photographic projector comprising; a housing having a window adapted to receive large or small size slides, a slide tray platform mounted adjacent said window and adapted to support a large size slide tray, a slide tray adaptor adapted to be supported by said slide tray platform to adapt the same to support a small size slide tray; a projection bulb and light condensing means mounted on a support, means movably mounting said support within said housing to form an optical axis by virtue of a cone of light produced by said bulb and condensing means, said support being movable to vary the area of said cone of light at said axis adjacent said window to selectively illuminate a large or a small size slide; slide guide means including a pair of members pivotally mounted adjacent the upper and lower edges of said window, each of said members having a first channel portion to receive a large size slide and a second channel portion to receive a small size slide, linkage means coupling said members to facilitate concurrent movement of said members to selectively support a large or a small size slide at said axis adjacent said window; a control member coupled to said support and to said linkage means to effect concurrent movement thereof to selectively adapt the projector for use with the large or small size slide, and interlock means including said control member, said interlock means cooperating with said slide tray platform to allow the use of said slide tray adaptor only when said support and said linkage means is moved to adapt the projector for use with a small size slide.

6. In combination with a photographic projector constructed and arranged to selectively project large or small size slides on a screen or the like by means of a beam of light, shutter means within said projector normally operative to restrict the beam of light, a drive member for said shutter means operative to open said shutter means to allow the beam of light to be projected, slide changing means including first and second spaced actuating members adapted to selectively engage said drive member to open said shutter means, the degree of opening of said shutter means being determined by engagement with said first or second actuating members, and control means connected to said drive member to selectively position said drive means to engage a selected one of said first or second actuating members, depending upon the size slide to be projected.

7. In a photographic projector, means including a source of illumination to form a cone of light projecting along an optical axis, slide guide means pivoted at a fixed position along said axis, said slide guide means having separate guides to receive different size slides to be projected, and further means cooperating with said first named means and with said slide guide means to change the area of said cone of light at said fixed position, and to pivot said slide guide means in accordance with the area of said cone at said fixed position to utilize the proper guide to support a slide of a size related to the area of said cone to thereby provide an optimum in slide illumination efficiency.

8. In a photographic projector adapted to selectively project large or small size slides, illumination means including light control means movably mounted to be selectively positioned at a first or second position along the optical axis of the projector to form a cone of light which is moveable along said optical axis, slide guide means having a first portion adapted to hold a large size slide at a fixed position along said optical axis and having a second portion adapted to hold a small size slide at said fixed position along said optical axis, means moveable mounting said slide guide means along said optical axis and means selectively operable to move said light control means and to move said slide guide means to selectively match the area of said cone of light at said fixed position to the particular portion of said slide guide means to facilitate the projection of the large or small size slides with the optimum in illumination efficiency of the slide.

References Cited by the Examiner
UNITED STATES PATENTS

| | | | |
|---|---|---|---|
| 1,174,479 | 3/16 | Darby | 88—24 |
| 2,203,658 | 6/40 | Schubert | 88—24 |
| 2,456,711 | 12/48 | Knutson | 88—24 |
| 2,704,008 | 3/55 | Owens | 88—24 X |
| 2,750,444 | 6/56 | Owens | 88—28 X |
| 3,031,922 | 5/62 | Stadler | 88—24 |

LEO SMILOW, *Primary Examiner.*

G. Y. CUSTER, *Examiner.*